United States Patent [19]

Penn et al.

[11] Patent Number: 4,868,687

[45] Date of Patent: Sep. 19, 1989

[54] AUDIO EDITOR DISPLAY INTERFACE

[75] Inventors: Steven C. Penn, Georgetown; Michael D. Wilkes, Austin, both of Tex.

[73] Assignee: International Business Machines Corporation, Armonk, N.Y.

[21] Appl. No.: 135,430

[22] Filed: Dec. 21, 1987

[51] Int. Cl.$^4$ ............................................. G11B 27/02
[52] U.S. Cl. ...................................... 360/13; 360/14.1
[58] Field of Search ......................... 360/13, 14.1–14.3, 360/32

[56] References Cited

U.S. PATENT DOCUMENTS 4,757,540  7/1988  Davis .................................... 360/13

FOREIGN PATENT DOCUMENTS 2036409  6/1980  United Kingdom .................. 360/13

OTHER PUBLICATIONS

"Electronic Editing of Digital Audio Programs", by Davis et al., In't. Conf. on Video & Data Recording, Southampton England, 7/79.

"Random-Access Editing of Digital Audio", by Ingebrersen et al., Audio Eng'r. So., vol. 32, #30, Mar. 1984, Primary Examiner—Vincent P. Canney
Attorney, Agent, or Firm—Thomas E. Tyson

[57] ABSTRACT

An audio editor comprising circuitry for converting a received audio sound recording into digital data blocks, where each data block represents a corresponding portion of the sound recording during a predetermined time interval. Also included is circuitry for storing the data blocks as a consecutive sequence representing the sound recording. A display circuit is provided for display the data blocks as a timed based graphical representation to a user. Also provided is a method of displaying the sound recording including the steps of (1) converting the received sound recording into digital data blocks, (2) displaying an axis representing time, (3) displaying a graphical representation of the digital data adjacent to the time axis corresponding to the relative time position of a corresponding sound recording portion in that time period, and (4) displaying at least one user locatable mark on the time axis representing a time point of the sound recording.

64 Claims, 10 Drawing Sheets

AUDIO EDITOR DISPLAY INTERFACE

TECHNICAL FIELD

This invention relates to data processing and more specifically to the application of data processing to digitized recording of sound.

BACKGROUND ART

The recording of soundtracks has, in the past, been accomplished by analog devices such as tape recorders. Editing of these sound recordings or soundtracks was accomplished by mechanically splicing tapes or by recording the soundtrack from one tape recorder onto another one making the editing changes during the recording on the second tape recorder.

Digital data, however, is edited on a digital processing system. One common application of digital data processing is text processing or text editing. Text editors for data processing systems are commonly used today. These text editors convert text information into a sequence of digital data that is stored in data blocks. Editing functions, such as inserting, deleting, moving or copying, are easily accomplished by manipulating these data blocks. The actual text is commonly displayed on a display screen to the text editor operator or user so that the operator may see the results of the commands given to the text editor and the actions taken by the text editor in response to these commands.

It would be desirous to provide a data processing application similar to the text editor for the editing of audio soundtracks.

It is the object of the present invention to provide an audio processing system that provides such editing functions as insert, delete, move or copy.

It is the further object of the present invention to provide an audio processing system with a display to the user that enables the user to easily view the current state of the audio data and the performance of the audio editing commands on the audio data.

DISCLOSURE OF THE INVENTION

In accordance with the present invention, an audio processing system is provided that includes a circuit for converting a received audio sound recording into digital data blocks where each block represents a corresponding portion of the sound recording during a predetermined time interval. Also included is a storing device for storing the data blocks as a consecutive sequence that represents the sound recording. The data processing system also includes a display of the data blocks as a time based graphical representation to the user.

Also in accordance with the present invention, the method for displaying a received sound recording is provided This method consists of the steps of (1) converting the received sound recording into digital data blocks, each data block representing a corresponding portion of the sound recording during a predetermined time interval, (2) displaying an axis representing time, (3) displaying a graphical representation of the digital data adjacent to the time axis in a manner corresponding to the relative time position of a corresponding sound recording portion in the time period, and (4) displaying at least one point on the time axis representing a time point of the sound recording during the time period.

BRIEF DESCRIPTION OF THE DRAWING

The novel features believed characteristic of the invention are set forth in the appended claims. The invention, however, as well as the other features and advantages thereof, will be best understood by reference to the detailed description which follows, when read in conjunction with the accompanying drawings, wherein:

BEST MODE FOR CARRYING OUT THE INVENTION

Figure 1:
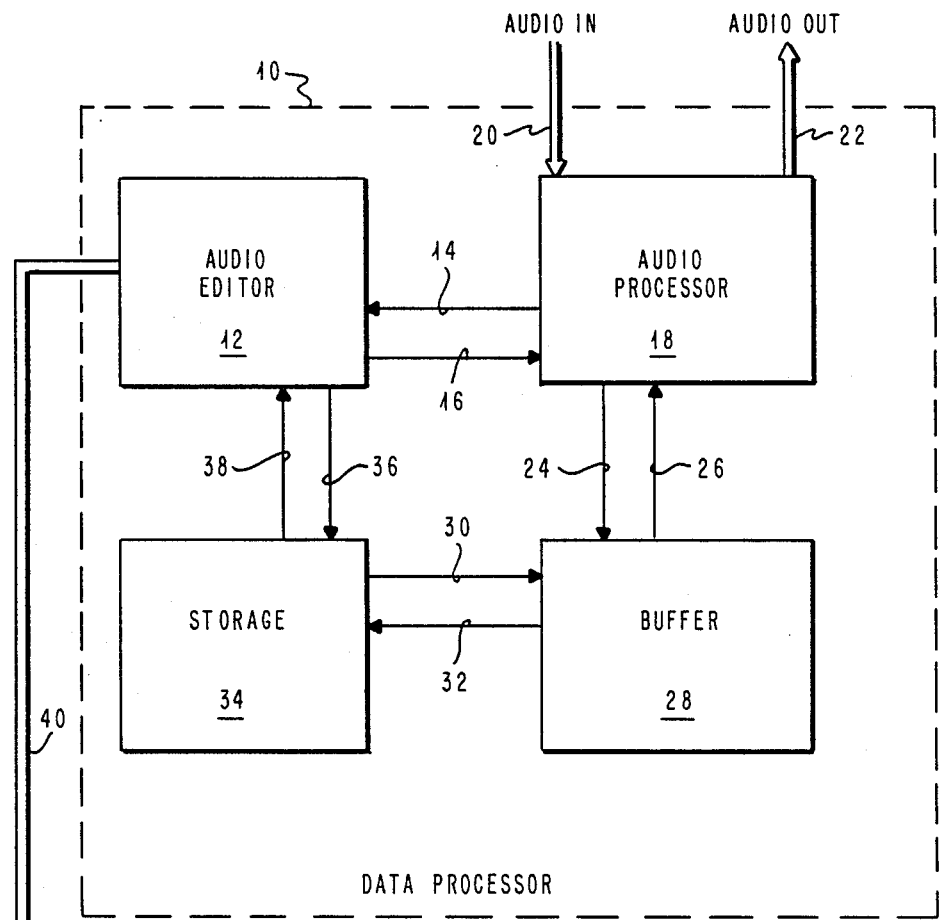
FIG. 1 is a block diagram of a data processing system configured as an audio editor.

This invention is an audio editor that in its preferred embodiment is implemented on a personal computer. Specifically in this embodiment, an IBM PC AT is used. This processor is represented in FIG. 1 as block 10. The processor includes the audio editor 12 which is the audio editor program being executed by the processor. Also included are storage 34, which can consist of both disk and RAM:(random access memory) storage, and a buffer storage 28 that interfaces between the storage 34 and audio processor 18. The buffer storage 28 can be a cache or a series of caches of a size suitable for the task to be performed by the audio editor in block 12. The audio processor 18 receives an audio input on line 20 and provides an audio output on line 22. In the preferred embodiment, the audio processor 18 is an Ariel DSP-16 (Real Time Data Acquisition Processor) available from Pacific Microcircuits Limited in Blaine, Washington. In this preferred embodiment, the audio processor includes the Texas Instruments TMS 32020 signal processor. The purpose of the audio processor is to digitize audio signals input on line 20 to provide digital data representative of the audio information input and to convert digital data from storage 34 in the data processor 10 to an audio signal which is output on audio line 22.

A terminal 42 is connected to the data processor 10 via line 40. The terminal 42 consists of a console display 44 and a keyboard 46.

The operation of this audio editor is to be similar to the operation of a text editor, such as one of the IBM DisplayWrite series products. In other words, a user friendly interface is to be provided to the operator to enable the operator to easily accomplish the editing task.

In FIG. 1, the audio editor 12 communicates with the audio processor over lines 14 and 16. The audio editor 12 also communicates with the storage 34 over lines 38 and 36. Data that is being passed between the audio processor 18 and the storage 34 and passes through the buffer 28 via lines 24, 26, 30 and 32. The control of the audio editor function is accomplished by the audio editor software represented as block 12.

Figure 2:
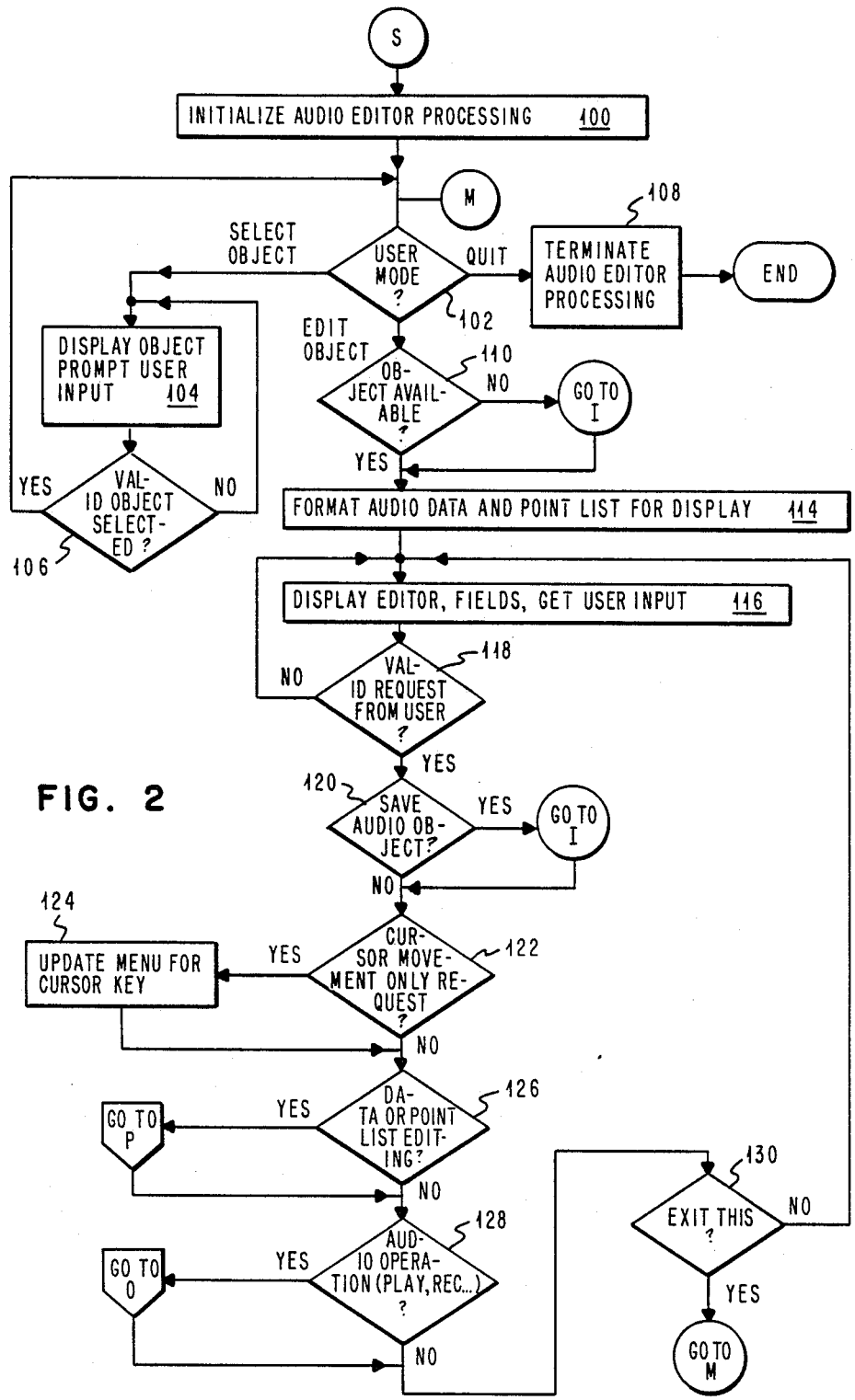
FIG. 2 is a flow chart of the audio editor executive routine.

In FIG. 2, the executive routine of the audio editor is illustrated. In step 100, the audio editor is initialized. This includes initializing any start-up variables and allocating storage for the program execution. In step 102, the program determines what mode the user wishes to program to operate. In the select object mode, the program proceeds to step 104 to display the object prompt and receive the user input. The object prompt is a request for the soundtrack, sound recording or audio object file name that is to be edited. Once an object file has been received, the program proceeds to step 106 to determine if it is a valid object. If not, the program returns to step 104. If a valid object is selected, the program returns to step 102. It should be apparent to those skilled in the art that several objects may be selected at a single time by the operator. However, in the preferred embodiment that is disclosed herein, only two such objects are displayed at any one time.

Returning to step 102, if the user decides to quit the program, the program proceeds to step 108 to terminate the audio editor program by deallocating storage and saving any modified audio files.

The term audio file will be used herein to describe any soundtrack, sound recording or audio information that is received by the audio processor 18 (FIG. 1) and that has been digitized into data blocks. In the preferred embodiment, a pulse coded modulation technique is used to sample the audio data being input to provide the audio information as a digitized data block that represents the audio information for a 1/50th of a second interval (termed a "segment"). The preferred sampling rate is 44,000 samples per second. It should be apparent to those skilled in the art that the sample size and the interval size can be varied.

Figure 3:
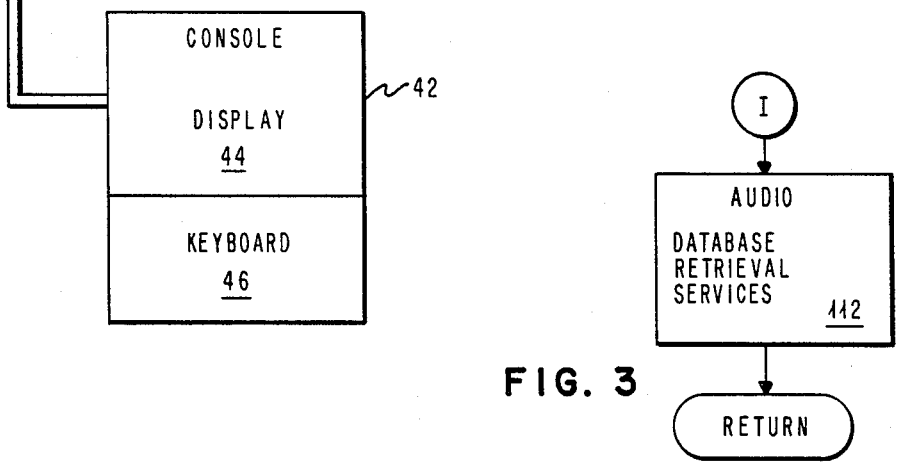
FIG. 3 is a flow chart of the audio editor retrieval subroutine.

In step 102, if the user desires to edit an object, the program proceeds to step 110 to determine if the object is available. If the object is not currently available, the program proceeds to Connector I. Connector I is illustrated in FIG. 3 and consists of step 112 which provides the audio database retrieval services. This retrieval function fetches the object from storage and places the object in the main memory for editing. Afterwards, the program returns to step 114. Likewise, if the object is available in step 110, the program proceeds to step 114.

In step 114, the audio data and the point list are formatted for display. The audio data and point list contain the audio editor information for the user or operator.

In step 116, the formatted audio data and point list are displayed. A sample of an initialized audio display and point list appears in FIG. 6. Section 216 is the audio display. Section 228 is the point list display. These two areas will be discussed in more detail later.

The program then proceeds to step 118 to determine if a valid request from the user has been entered. This request can be entered from either a keyboard command or from the use of a mouse input device. If the request is not valid, the program returns to step 116. However, if the request is valid, the program proceeds to step 120. In step 120, the program determines if the request was to save the audio object. If so, the program proceeds to the audio database retrieval services in block 112 (FIG. 3) to save the audio object. If the audio object is not to be saved or upon completion of saving the audio object, the program proceeds to step 122 to determine if the request is to move the cursor. The cursor can be moved by either the mouse or by the keyboard cursor keys. If cursor movement has been requested, the program proceeds t step 124 to move the cursor on the screen.

In step 126, the program determines if the audio data or point list is to be edited. If so, the program proceeds to the editing subroutine illustrated in FIG. 5.

In step 128, the program determines if an audio operation is requested. If so, the program proceeds to the audio operation subroutine illustrated in FIG. 4. In step 130, the program determines if the user is requesting to exit the editing of the present object. If so, the program proceeds to connector M which starts program execution again in step 102. If not, the program proceeds to execute step 116 again.

Figure 4:
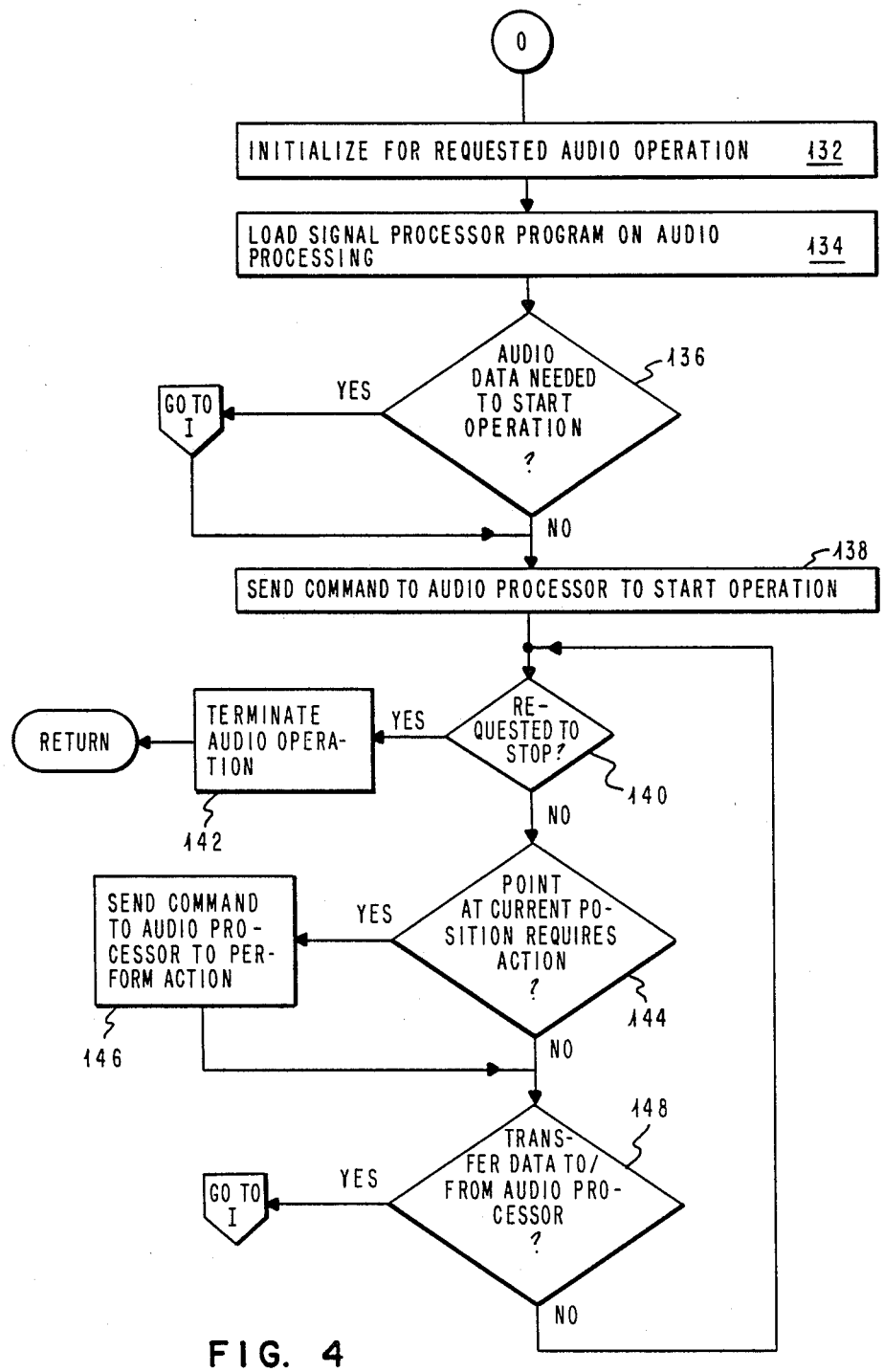
FIG. 4 is a flow chart of the audio editor interface to the signal processor.

FIG. 4 illustrates the audio operation routine. In step 132, initialization takes place for the requested audio operation. In step 134, the signal processor program is loaded onto the audio processor 18. In step 136, it is determined whether the audio data that is needed to start the operation is available. If so, the program proceeds to the audio database retrieval services in FIG. 3. If not, the program proceeds to step 138 to send a command to the audio processor to start the operation.

In step 140, the program determines if the user is requested to stop. If so, the program proceeds to step 142 to terminate the audio operation. If not, the program proceeds to step 144 to determine if at this current time point, some type of action is required. If so, the program proceeds to step 146 to send the appropriate command to the audio processor to perform the action. Then, in step 148, the program determines if data is to be transferred to or from the audio processor. If so, the program proceeds to the audio database retrieval services (FIG. 3). The program then proceeds back to step 140.

Figure 5:
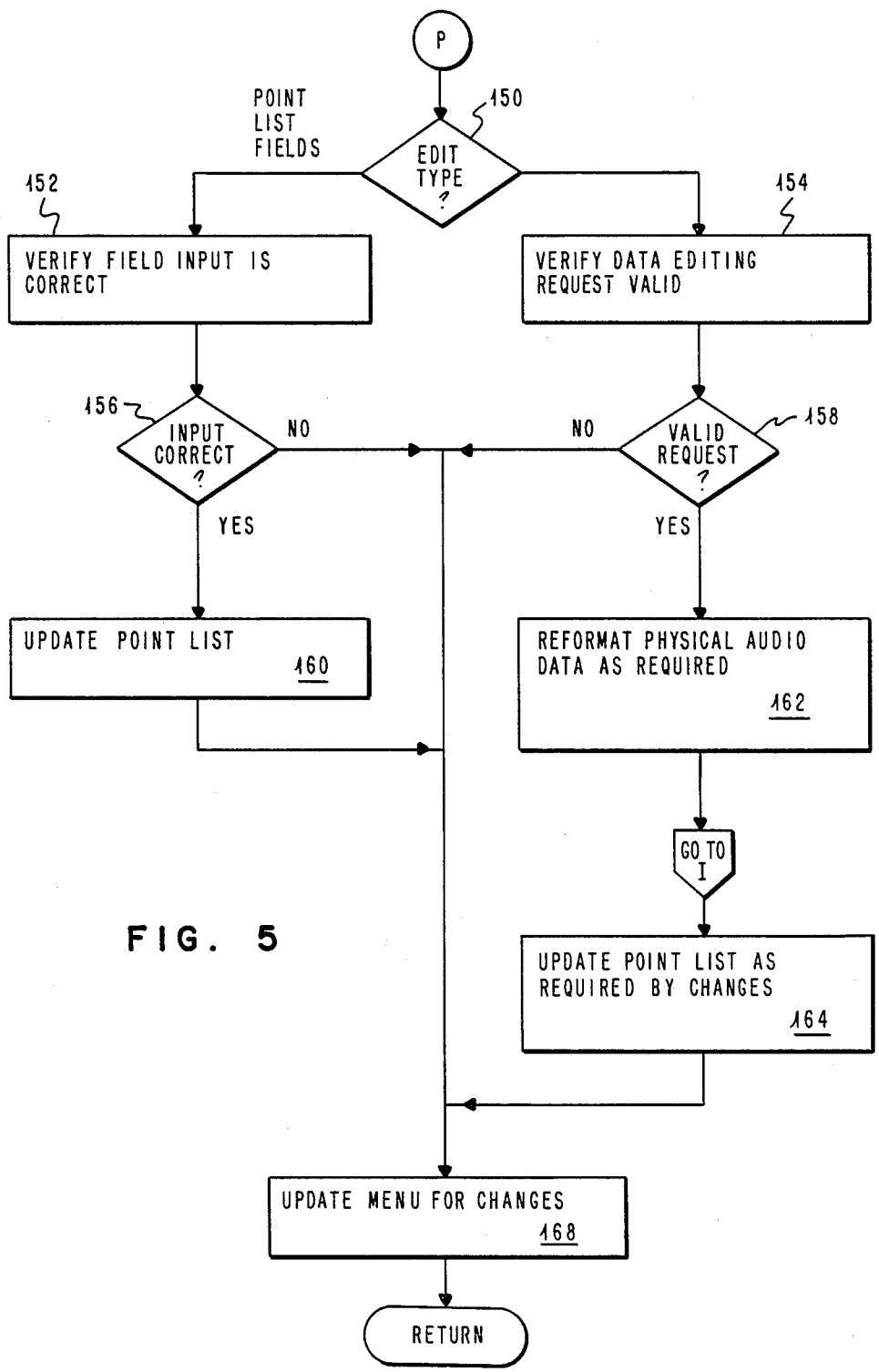
FIG. 5 is a flow chart of the editing subroutine for the audio editor.

In FIG. 5, the editing of the audio data or point list is performed. In step 150, the type of editing required is determined. If the audio data is to be edited, the program proceeds to step 154. If the point list is to be edited, the program proceeds to step 152. In step 152, the program verifies that the field input is correct. If the input is correct as determined in step 156, the program then proceeds to update the point list in step 160. Returning to step 154, the program determines if the data editing request is valid. If the request is valid as determined in step 158, the program proceeds to step 162 to reformat the physical audio data that is being displayed. From step 162, the program proceeds to the audio database retrieval services in FIG. 3 and then to step 164 to update the point list as required. If either of the requests are not valid from steps 156 and 158, or upon completion of the updated point list in step 160 and 164, the program proceeds to step 168 to update any fields for changes.

Figure 6:
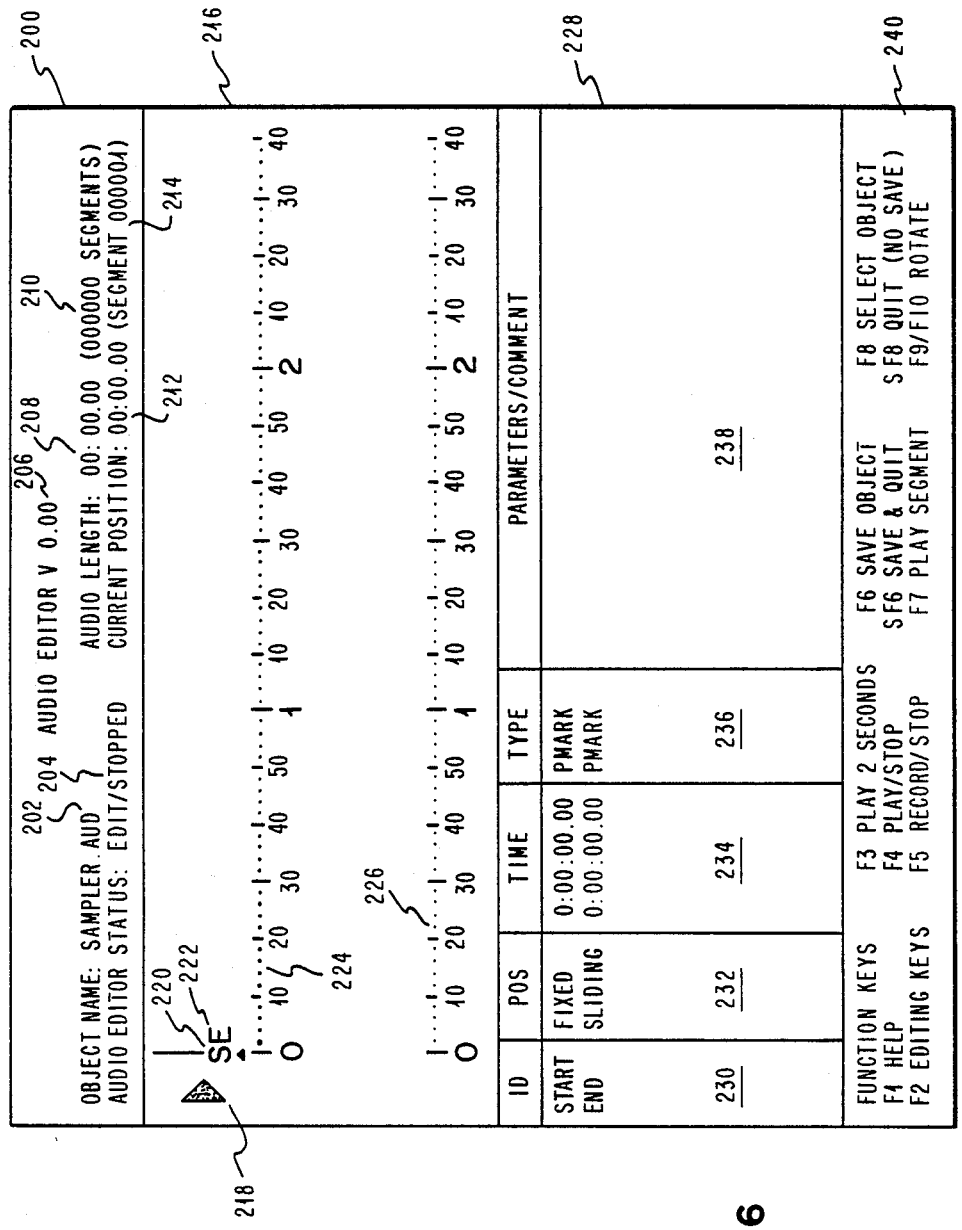
FIG. 6 is an audio editor initial display.

FIG. 6 is an illustration of the initial audio editor display. The object name is listed in area 202 as SAMPLER.AUD. The current audio editor status is listed in area 204 as edit/stopped. The audio length (in time) is listed in area 208. The time is also listed in terms of segments in area 210. The current position of the editor in the object is listed in area 212. The corresponding segment is also listed in area 214. Note that the current position is always in front of the block to be edited. The current version of the audio editor is listed in area 206.

The above comprise the header area 200. The audio data appears in area 216. Two time lines, 224 and 226, are illustrated containing tick marks for minutes and seconds as shown. The first time line 224 represents the time line for the first object. The second time line 226 is used for the second object. Indicator 218 indicates the time line for the present object.

Also included are pointers 220 and 222. These pointers represent the start and end of the object. In the present example, there is no object and therefore, the start and end both reside at 0 time.

The point list is illustrated in area 228 and consists of an "ID" section 230, a corresponding position (either sliding or fixed) section 232, a time section 234, a type section 236, and a parameter/comment section 238. A command prompt area 240 is also provided to display the possible commands that a user can provide.

Figure 7:
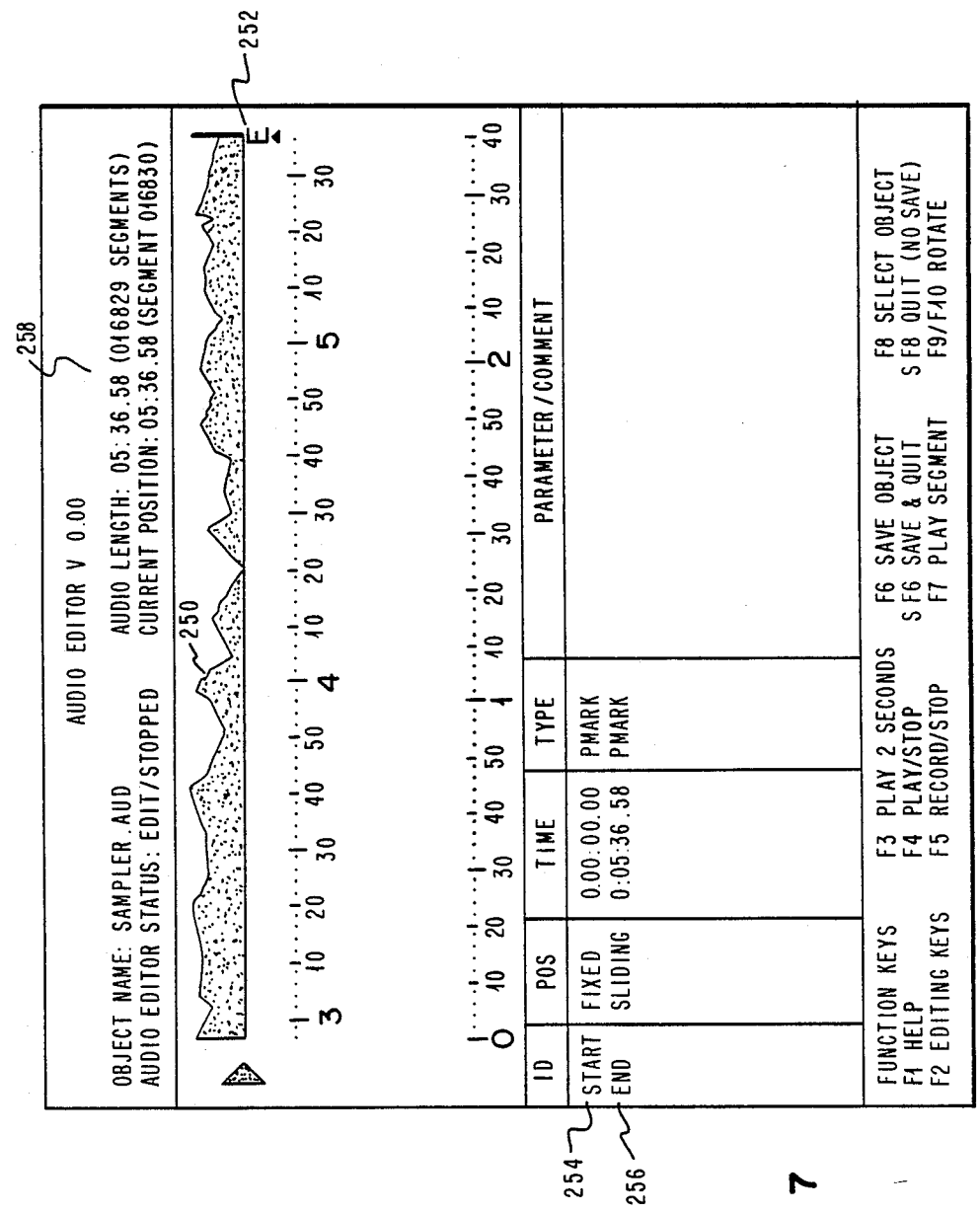
FIG. 7 is an audio editor display illustrating one soundtrack.

In FIG. 7, a new audio object file named "SAMPLER.AUD" is being created by recording. Waveform 250 is a portion of the total sound recording. The length of this object file is 5 minutes, 36.58 seconds as listed in the audio length section 258. The end marker 252 denotes this end point on the time axis. In the point list, the start pointer 254 indicates that the starting time is 0. The end marker 256 indicates that the length of this recording is 5 minutes, 36.58 seconds.

The volume history waveform 252 has been scrolled to display the end point. The 5 minutes and 36.58 seconds of recording for SAMPLER.AUD equals 16,829 1/50th second blocks of data. The volume history is the average volume of blocks for a display interval. The display interval of blocks represented in each volume history would depend upon the resolution of the console used to provide the audio editor display.

Volume history for the waveform 252 may not be appropriate in all applications. Therefore, another feature, such as frequency, may be used as the basis for the waveform 252.

In the point list, the start point is listed as having a fixed position. The fixed position means that the position of this mark is permanently fixed as to time. The end mark 256, on the other hand, is a sliding mark. This means that the location of this mark is varied across the time axis but is fixed relative to some portion of the sound recording. Therefore, as additional segments would be added to the SAMPLER.AUD object file, the end point would be appropriately adjusted outwardly. Both the start mark 254 and the end mark 256 are listed as P mark type. A P mark indicates that the mark is permanent and that it cannot be removed by the user.

Figure 8:
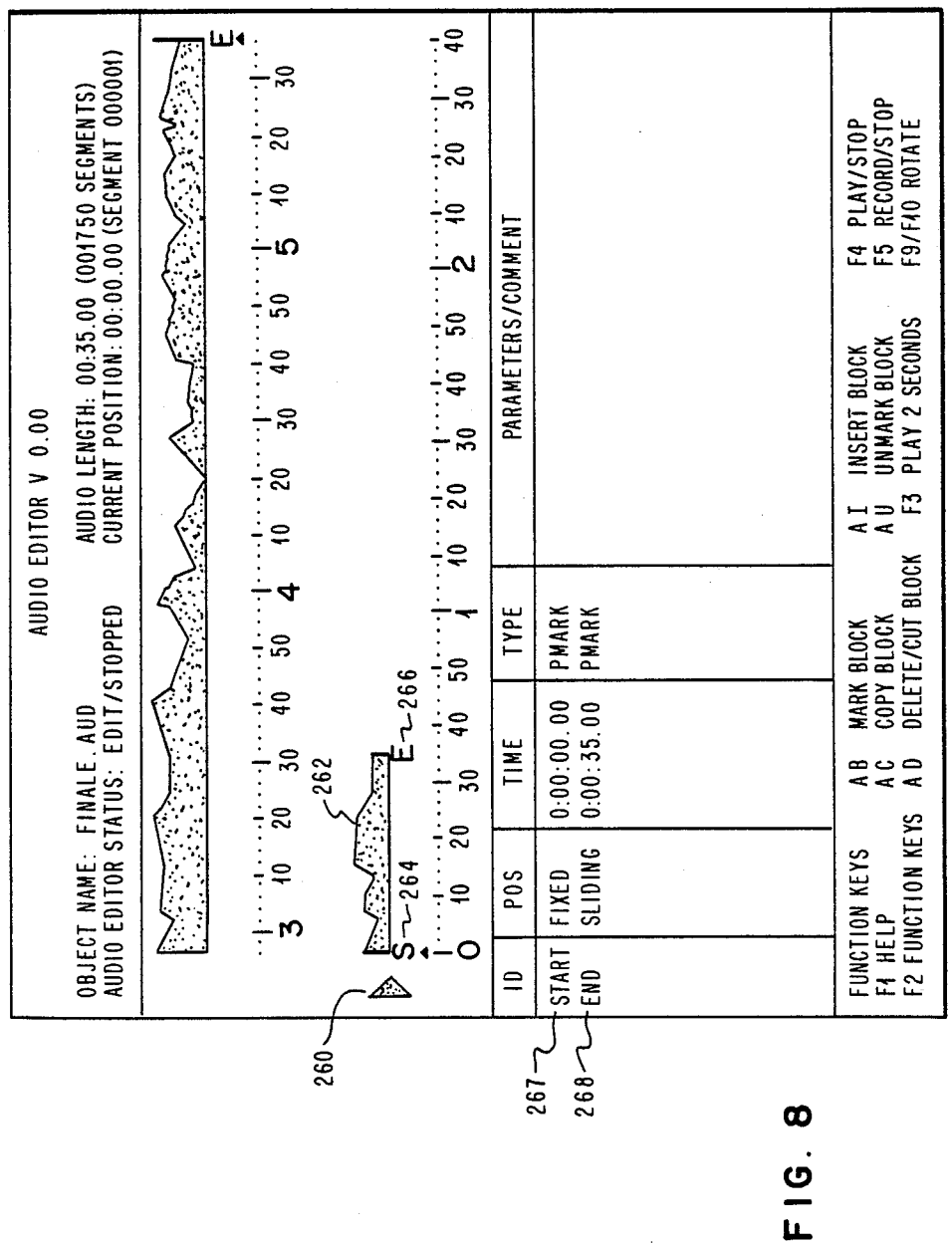
FIG. 8 is an audio editor display illustrating two soundtracks.

In FIG. 8, a second audio object has been selected. The audio object indicator 260 has been moved from the top audio object line to the bottom audio object line. The bottom audio object is listed as FINALE.AUD and consists of a sound recording of 35.00 seconds (or 1750 1/50th second data segments). This is also illustrated by the updated point list consisting of the start pointer 267 and the end pointer 268.

Figure 9:
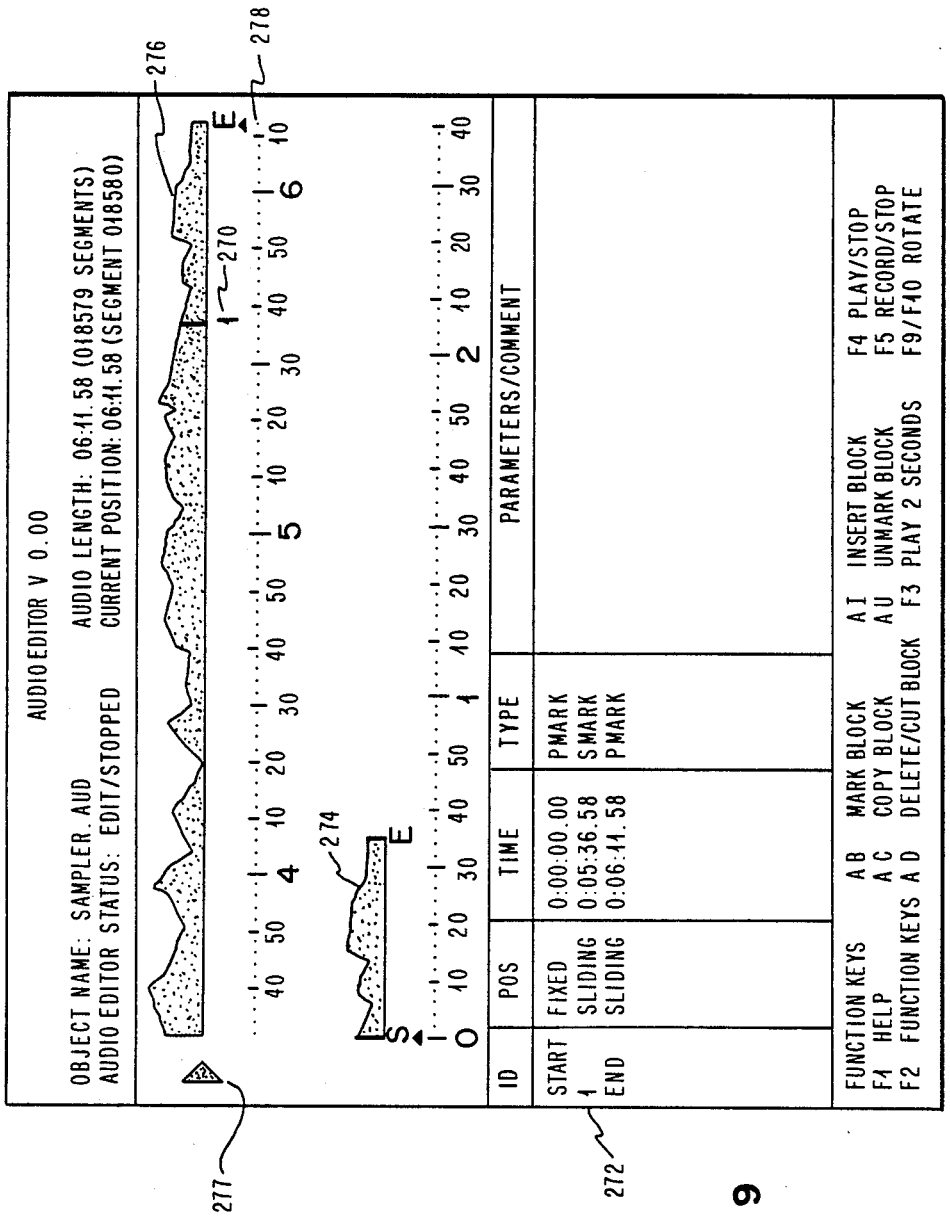
FIG. 9 is an audio editor display illustrating a copying function.

In FIG. 9, the entire audio object file FINALE.AUD has been inserted at the end of the object file SAMPLER.AUD. This results in the reselection of the first audio object as indicated by the change in pointer 277. Note that the waveform 274 (the FINALE AUD waveform) has been inserted after point 270 as waveform 276. Note that the end pointer 278 has been repositioned. Time point 1 270 has been added to indicate where the old SAMPLER.AUD ended. Likewise, the point list 272 has been updated. Point 1 now is listed as 5 minutes 36.58 seconds (the old end of SAMPLER.AUD) and is shown as an Smark. A Smark is a system mark that is generated by the audio editor automatically to indicate the occurrence of some event for possible later use by the operator. The end mark has also been updated as illustrated in the time column.

Figure 10:
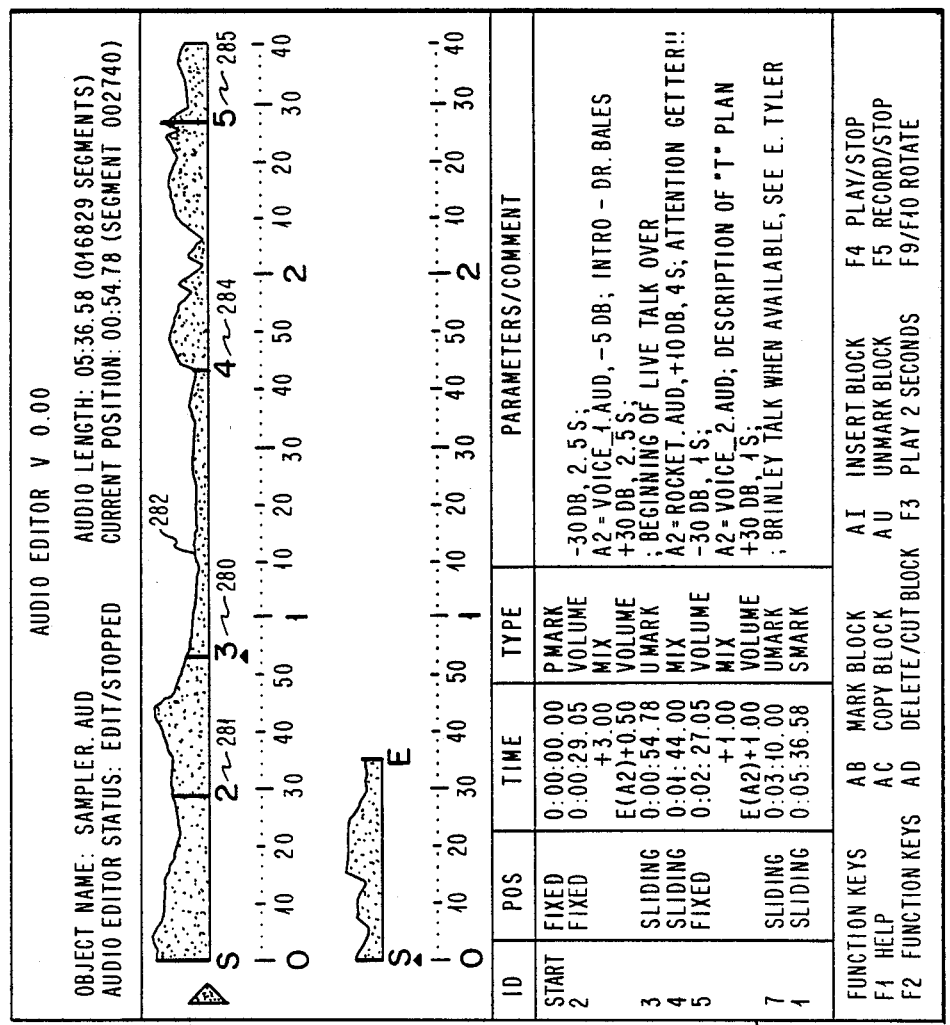
FIG. 10 is an audio editor display illustrating the use of time marks.

FIG. 10 illustrates the results of considerable editing wherein the user has added appropriate points within the SAMPLER.AUD object and defining their properties in the point list. Note that the SAMPLER.AUD object waveform 282 has been scrolled back to the start position. The display presented to the user displays 2 minutes and 40 seconds of waveform. However, since the objects will often be of greater length, the user has the capability to scroll the display to view the portion of interest. The waveform 282 includes several time points such as time point 2 281, time point 3 280, time point 4 and time point 5 285. The definition of these time points is contained in the point list 286. Point 2 281 has been added to define the starting of another audio object entitled "VOICE_1.AUD" that is to be mixed with SAMPLER.AUD which, according to the point list 286, is to be reduced in volume. Therefore, time point 2 (in the point list 286) includes a volume command for the SAMPLER.AUD track, a mix command, and a volume command for the track to be mixed. Point 3 has been added as a user mark (Umark) at the beginning of a live talkover to be done in real time during the playing of the audio. Point 4 marks a special sound effect. Note that the sound effect to be mixed in point 4 is redefined in the Parameter/Comment section. Both points 3 and 4 are sliding points which allows them to remain with their associated audio portions regardless of the editing operations. In other words, these points will remain fixed with the appropriate audio data but may "slide" with respect to the time axis as the audio object is edited. Point 5 is another voice-over operation similar to that associated with point 2. Point 7 marks the spot for another voice-over that may be added later. The end point is not displayed but may be scrolled into view if necessary.

Figure 11:
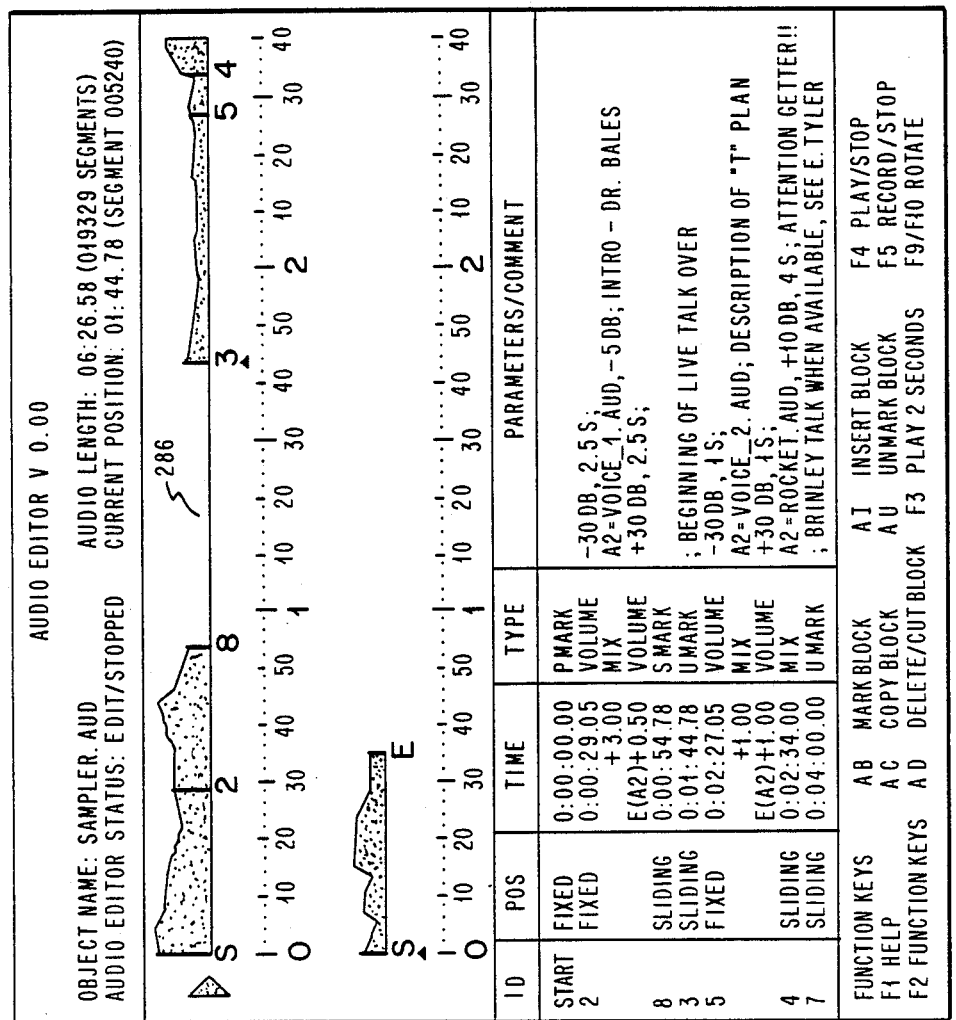
FIG. 11 is an audio editor display illustrating a recording function.

FIG. 11 illustrates the user display after a record function has been invoked to record 50 seconds of silence into the current position of display between marks 8 to 3. This is evidenced by the lack of the waveform in location 286. The audio editor has inserted the recorded silence in front of point 3 and added point 8 to define the start position of this new recording. Note that points with the sliding property (i.e., points 3 and 4) have been moved along as the audio is pushed in front of the newly recorded material. The points with the fixed property (i.e., point 5) have remained at the same time displacement (i.e., their position is constant relative to the time axis). It should also be noted that the point list 287 does not display the end pointer. Like the waveform for the object files, the point list may be scrolled upwardly or downwardly to display the different portion of the total list.

While the invention has been described with reference to the illustrated embodiment, this description is not intended to be construed in a limiting sense. Various modifications of the illustrated embodiment as well as other embodiments of the invention will become apparent to those persons skilled in the art upon reference to this description. It is, therefore, contemplated that these appended claims will cover any such modifications or embodiments as fall within the true scope of the invention.

We claim:

1. A method of displaying a received sound recording received over a time period comprising the steps of:
converting the received sound recording into digital data blocks, each data block representing a corresponding portion of said sound recording during a predetermined time interval;
displaying an axis representing time;
displaying a graphical representation of said digital data adjacent to said time axis corresponding to the relative time position of a corresponding sound recording portion in said time period;
displaying at least one user locatable mark on said time axis representing a time point of said sound recording during said time period;
displaying a textual list of said at least one time mark and an operator input editing command that is to be executed on the sound recording at the time represented by the mark; and
providing an audio signal representative of said sound recording while displaying a mark adjacent to the graphical representation of said digital data and time line representing the current time position in the time period of the audio signal being provided.

2. A method according to claim 1 wherein said graphical representation is a representation of the sound recording volume.

3. A method according to claim 1 wherein said graphical representation is a representation of the sound recording frequency.

4. A method according to claim 1 further including the step of displaying a second sound track as a graphical representation of digital data representing said second sound recording adjacent to a second time axis.

5. A method according to claim 4 wherein said step of displaying the textual list of said at least one time mark includes the displaying of a second time mark representing a time point on the second time axis.

6. A method according to claim 5 wherein said editing commands include inserting a portion of a sound recording.

7. A method according to claim 5 wherein said editing commands include deleting a portion of a sound recording.

8. A method according to claim 8 wherein said editing commands include moving a portion of a sound recording.

9. A method according to claim 8 wherein said editing commands include copying of a portion of a sound recording.

10. A method according to claim 6 wherein said portion of said sound recording for said editing command is indicated by time marks on the respective time axes for the sound recording that is the object of the editing command.

11. A method according to claim 10 wherein said time marks can be designated as being fixed at a specified time on the time axis or can be designated as fixed at a specified point in the sequence of digital data blocks.

12. A method according to claim 11 wherein said listing of time marks in the textual list includes a listing of the current time location of the respective marks on their respective time axes.

13. An audio processing system comprising:
means for converting a received sound recording into digital data blocks, each data block representing a corresponding portion of said sound recording during a predetermined time interval;
first means connected to said converting means for displaying an axis representing time and displaying a graphical representation of said digital data adjacent to said time axis corresponding to the relative time position of a corresponding sound recording portion in said time period while displaying at lease one user locatable mark on said time axis representing a time point of said sound recording during said time period;
second means connected to said converting means and said first display means for displaying a textual list of said at least one time mark and an operator input editing command that is to be executed on the sound recording at the time represented by the mark; and
means connected to said converting means and said first and second display means for providing an audio signal representative of said sound recording while displaying a mark adjacent to the graphical representation of said digital data and time line representing the current time position in the time period of the audio signal being provided.

14. An audio processing system according to claim 13 further including means for displaying a second sound track as a graphical representation of digital data representing said second sound recording adjacent to a second time axis.

15. An audio processing system according to claim 14 wherein said means for displaying the textual list of said at least one time mark includes means for displaying a second time mark representing a time point on the second time axis.

16. An audio processing system according to claim 15 further including means responsive to editing commands for inserting a portion of a sound recording.

17. An audio processing system according to claim 15 further including means responsive to the editing command for deleting a portion of a sound recording.

18. An audio processing system according to claim 15 further including means responsive to the editing commands for moving a portion of a sound recording.

19. An audio processing system according to claim 15 further including means responsive to the editing commands for copying of a portion of a sound recording.

20. An audio processing system according to claim 16 further including means for indicating said portion of said sound recording for said editing command is by time marks on the respective time axes for the sound recording that is the object of the editing command.

21. An audio processing system according to claim 20 further including means for designating said time marks as being fixed at a specified time on the time axis or as fixed at a specified point in the sequence of digital data blocks.

22. An audio processing system according to claim 21 further including means for listing of time marks in the textual list as a listing of the current time location of the respective marks on their respective time axes.

23. A method of displaying a received sound recording received over a time period comprising the steps of:
converting the received sound recording into digital data blocks, each data block representing a corresponding portion of said sound recording during a predetermined time interval;

displaying an axis representing time adjacent to a graphical representation of said digital data corresponding to the relative time position of a corresponding sound recording portion in said time period;

displaying at least one mark on said time axis representing a current time point during the time period corresponding to a current sound recording data block conversion; and simultaneously displaying a textual list of said at least one time mark and an operator input editing command that is to be executed on the sound recording at the time represented by the mark.

24. A method according to claim 23 further including the step of providing an audio signal representative of said sound recording while displaying a mark adjacent to the graphical representation of said digital data and time line representing the current time position in the time period of the audio signal being provided.

25. A method according to claim 23 wherein said graphical representation is a representation of the sound recording volume.

26. A method according to claim 23 wherein said graphical representation is a representation of the sound recording frequency.

27. A method according to claim 26 further including the step of displaying a second sound track as a graphical representation of digital data representing said second sound recording adjacent to a second time axis.

28. A method according to claim 27 wherein said step of displaying the textual list of said at least one time mark includes the displaying of a second time mark representing a time point on the second time axis.

29. A method according to claim 28 wherein said editing commands include inserting a portion of a sound recording.

30. A method according to claim 29 wherein said editing commands include deleting a portion of a sound recording.

31. A method according to claim 29 wherein said editing commands include moving a portion of a sound recording.

32. A method according to claim 29 wherein said editing commands include copying of a portion of a sound recording.

33. A method according to claim 29 wherein said portion of said sound recording for said editing command is indicated by time marks on the respective time axes for the sound recording that is the object of the editing command.

34. A method according to claim 29 wherein said time marks can be designated as being fixed at a specified time on the time axis or can be designated as fixed at a specified point in the sequence of digital data blocks.

35. A method according to claim 34 wherein said listing of time marks in the textual list includes a listing of the current time location of the respective marks on their respective time axes.

36. A method of displaying a received sound recording received over a time period comprising the steps of:
converting the received sound recording into digital data blocks, each data block representing a corresponding portion of said sound recording during a predetermined time interval;
displaying an axis representing time;
displaying a graphical representation of said digital data adjacent to said time axis corresponding to the relative time position of a corresponding sound recording portion in said time period;
displaying at least one mark on said time axis representing a time point of said sound recording during said time period; and
simultaneously displaying adjacent to the time axis, sound recording graphical representation and time mark, a textual list including a description of parameters describing the time mark.

37. A method of displaying at least two received sound recordings received over a time period and each converted into digital data blocks, each data block representing a corresponding portion of said respective sound recording during a predetermined time interval comprising the steps of:
displaying at least one axis representing time;
displaying for each sound recording a graphical representation of said digital data adjacent to said time axis corresponding to the relative time position of a corresponding sound recording portion in said time period; and
displaying at least one user locatable mark on each of said time axes representing a time point of said sound recording during said time period.

38. A method according to claim 37 further including the step of displaying a textual list of said at least one time mark and an operator input editing command that is to be executed on the sound recording at the time represented by the mark.

39. A method of displaying a received sound recording received over a time period and converted into data blocks comprising the steps of:
displaying an axis representing time;
displaying a graphical representation of said digital data adjacent to said time axis corresponding to the relative time position of a corresponding sound recording portion in said time period;
displaying at least one use locatable mark on said time axis representing a time point of said sound recording during said time period; and
displaying a command prompt area having a plurality of commands, each command providing an editing function to the user of editing the received sound recording.

40. A method according to claim 39 wherein said graphical representation is a representation of the sound recording volume.

41. A method according to claim 39 wherein said graphical representation is a representation of the sound recording frequency.

42. A method according to claim 39 wherein said step of displaying the textual list of said at least one time mark includes the displaying of an operator input editing command that is to be executed on the sound recording at the time represented by the mark.

43. A method according to claim 42 further including the step of providing an audio signal representative of said sound recording while displaying a mark adjacent to the graphical representation of said digital data and time line representing the current time position in the time period of the audio signal being provided.

44. A method according to claim 43 further including the step of displaying a second sound track as a graphical representation of digital data representing said second sound recording adjacent to a second time axis.

45. A method according to claim 44 wherein said step of displaying the textual list of said at least one time mark includes the displaying of a second time mark representing a time point on the second time axis.

46. A method according to claim 45 wherein said editing commands include a command for inserting a portion of a sound recording.

47. A method according to claim 45 wherein said editing commands include a command for deleting a portion of a sound recording.

48. A method according to claim 45 wherein said editing commands include a command for moving a portion of a sound recording.

49. A method according to claim 45 wherein said editing commands include a command for copying of a portion of a sound recording.

50. A method according to claim 45 wherein said portion of said sound recording for said editing command is indicated by time marks on the respective time axes for the sound recording that is the object of the editing command.

51. A method according to claim 50 wherein said time marks can be designated as being first at a specified time on the time axis or can be designated as fixed at a specified point in the sequence of digital data blocks.

52. A method according to claim 51 wherein said listing of time marks in the textual list includes a listing of the current time location of the respective marks on their respective time axes.

53. An audio processing system comprising:
means for converting a received sound recording into digital data blocks, each data block representing a corresponding portion of said sound recording during a predetermined time interval;
first means connected to said converting means for displaying an axis representing time and displaying a graphical representation of said digital data adjacent to said time axis corresponding to the relative time position of a corresponding sound recording portion in said time period while displaying at least one user locatable mark on said time axis representing a time point of said sound recording during said tim period; and
second means connected to said first means for displaying a command prompt area having a plurality of commands, each command providing an editing function to the user for editing the received sound recording.

54. An audio processing system according to claim 53 further including a third means connected to said converting means and said first and second display means for displaying a textual list of said at least one time mark and an operator input editing command that is to be executed on the sound recording at the time represented by the mark.

55. An audio processing system according to claim 54 further including means connected to said converting means and said first, second and third display means for providing an audio signal representative of said sound recording while displaying a mark adjacent to the graphical representation of said digital data and time line representing the current time position in the time period of the audio signal being provided.

56. An audio processing system according to claim 55 further including means for displaying a second sound track as a graphical representation of digital data representing said second sound recording adjacent to a second time axis.

57. An audio processing system according to claim 56 wherein said means for displaying the textual list of said at least one time mark includes means for displaying a second time mark representing a time point on the second time axis.

58. An audio processing system according to claim 57 further including means responsive to editing commands for inserting a portion of a sound recording.

59. An audio processing system according to claim 57 further including means responsive to the editing commands for deleting a portion of a sound recording.

60. An audio processing system according to claim 57 further including means responsive to the editing commands for moving a portion of a sound recording.

61. An audio processing system according to claim 57 further including means responsive to the editing commands for copying of a portion of a sound recording.

62. An audio processing system according to claim 58 further including means for indicating said portion of said sound recording for said editing command is by time marks on the respective time axes for the sound recording that is the object of the editing command.

63. An audio processing system according to claim 62 further including means for designating said time marks as being fixed at a specified time on the time axis or as fixed at a specified point in the sequence of digital data blocks.

64. An audio processing system according to claim 63 further including means for listing of time marks in the textual list as a listing of the current time location of the respective marks on their respective time axes.

* * * * *

UNITED STATES PATENT AND TRADEMARK OFFICE
CERTIFICATE OF CORRECTION

PATENT NO. : 4,868,687
DATED : September 19, 1989
INVENTOR(S) : S. C. Penn et al It is certified that error appears in the above-identified patent and that said Letters Patent is hereby corrected as shown below:

Col. 7, line 48, delete "8" and insert --5--.
Col. 7, line 51, delete "8" and insert --5--.
Col. 8, line 10, delete "lease" and insert --least--.
Col. 8, lines 42-43, delete "command" and insert --commands--.
Col. 10, line 38, delete "use" and insert --user--.
Col. 11, line 21, delete "first" and insert --fixed--.
Col. 11, line 41, delete "tim" and insert --time--.

Signed and Sealed this

Seventh Day of January, 1992

Attest:

HARRY F. MANBECK, JR.

*Attesting Officer*     *Commissioner of Patents and Trademarks*